(12) United States Patent
Tochihara

(10) Patent No.: US 10,359,006 B2
(45) Date of Patent: Jul. 23, 2019

(54) VAPORIZED FUEL PROCESSING DEVICE

(71) Applicant: Hamanakodenso Co., Ltd., Kosai, Shizuoka-pref. (JP)

(72) Inventor: Hideya Tochihara, Kosai (JP)

(73) Assignee: Hamanakodenso Co., Ltd., Kosai, Shizuoka-Pref. (JP)

( * ) Notice: Subject to any disclaimer, the term of this patent is extended or adjusted under 35 U.S.C. 154(b) by 179 days.

(21) Appl. No.: 15/416,027

(22) Filed: Jan. 26, 2017

(65) Prior Publication Data

US 2017/0234270 A1  Aug. 17, 2017

(30) Foreign Application Priority Data

Feb. 15, 2016 (JP) .................... 2016-026074

(51) Int. Cl.
| | |
|---|---|
| *F02M 25/08* | (2006.01) |
| *B01D 53/04* | (2006.01) |
| *F02D 41/00* | (2006.01) |
| *B60K 15/035* | (2006.01) |
| *F02M 25/00* | (2006.01) |

(52) U.S. Cl.
CPC ..... *F02M 25/0836* (2013.01); *B01D 53/0454* (2013.01); *B60K 15/03504* (2013.01); *B60K 15/03519* (2013.01); *F02D 41/003* (2013.01); *F02M 25/00* (2013.01); *F02M 25/0818* (2013.01); *F02M 25/0854* (2013.01); *B01D 2257/7022* (2013.01); *B01D 2259/4516* (2013.01); *B60K 2015/03514* (2013.01); *B60Y 2400/306* (2013.01)

(58) Field of Classification Search
CPC ............. F02M 25/0836; F02M 25/00; F02M 25/0818; F02M 25/0854; F02D 41/003; B01D 53/0454; B01D 2257/7022; B01D 2259/4516; B60K 15/03504; B60K 15/03519; B60K 2015/03514; B60K 2400/306
USPC .......................................... 123/519
See application file for complete search history.

(56) References Cited

U.S. PATENT DOCUMENTS

| | | | | |
|---|---|---|---|---|
| 5,146,902 A | * | 9/1992 | Cook ................. | F02M 25/0818 123/198 D |
| 5,297,529 A | * | 3/1994 | Cook ................. | F02M 25/0818 123/198 D |

(Continued)

FOREIGN PATENT DOCUMENTS

| | | |
|---|---|---|
| JP | H06299921 A | 10/1994 |
| JP | 2007-032523 A | 2/2007 |

(Continued)

*Primary Examiner* — David E Hamaoui
*Assistant Examiner* — Susan E Scharpf
(74) *Attorney, Agent, or Firm* — Harness, Dickey & Pierce, P.L.C.

(57) ABSTRACT

A vaporized fuel processing device includes a fuel tank storing fuel used for an internal combustion engine, a pressurizing portion performing a pressurizing process to increase an inner pressure of the fuel tank by supplying gas from outside to inside the fuel tank, and a controller controlling an operation of the pressurizing portion. The controller controls the pressurizing portion to perform the pressurizing process and to keep the inner pressure of the fuel tank at or above a predetermined pressure value at which vaporized fuel is prevented from flowing out of the fuel tank, except for a time of fueling of the fuel tank.

6 Claims, 7 Drawing Sheets

(56) References Cited

U.S. PATENT DOCUMENTS

| | | | | |
|---|---|---|---|---|
| 5,359,978 A | * | 11/1994 | Kidokoro | F02M 25/08 123/516 |
| 2005/0188851 A1 | * | 9/2005 | Yamazaki | F02M 25/0854 96/153 |
| 2007/0023015 A1 | | 2/2007 | Uchida et al. | |
| 2007/0151610 A1 | * | 7/2007 | Hatano | F02M 25/089 137/572 |
| 2011/0247595 A1 | * | 10/2011 | Ogita | F02M 25/089 123/521 |
| 2011/0308302 A1 | * | 12/2011 | Makino | F02M 25/0836 73/40.7 |
| 2014/0102419 A1 | * | 4/2014 | Senda | F02M 25/089 123/519 |
| 2015/0040645 A1 | | 2/2015 | Takakura et al. | |

FOREIGN PATENT DOCUMENTS

| | | |
|---|---|---|
| JP | 2012229636 A | 11/2012 |
| JP | 2013-164041 A | 8/2013 |
| JP | 2013-185526 A | 9/2013 |
| JP | 5696906 B2 | 4/2015 |

* cited by examiner

VAPORIZED FUEL PROCESSING DEVICE

CROSS REFERENCE TO RELATED APPLICATION

This application is based on and incorporates herein by reference Japanese Patent Application No. 2016-026074 filed on Feb. 15, 2016.

TECHNICAL FIELD

The present disclosure relates to a vaporized fuel processing device in a vehicle.

BACKGROUND

In a device disclosed by Patent Document 1 (JP 5696906 B2, corresponding to US 2014/0102419 A1), fuel in a fuel tank evaporates from its liquid surface, and an upper space of the fuel tank is filled with the evaporated fuel. Thus, an inner pressure of the fuel tank increases. Since leakage of the vaporized fuel may cause atmospheric pollution, the device of the Patent Document 1 accumulates the vaporized fuel in a canister by adsorption of the vaporized fuel to the canister. When a negative pressure is produced in an intake passage of an engine, the vaporized fuel accumulated in the canister is supplied to the engine together with an intake air. Hence, the vaporized fuel is purged by combustion in a combustion chamber. Accordingly, release of the vaporized fuel to the atmosphere is limited.

In recent years, an engine loss has been reducing, and an engine negative pressure has decreased because of improvement of gasoline engine technology. Further, for example, a hybrid automobile stops an engine while running and uses another energy source to run. Therefore, generated vaporized fuel may not be purged sufficiently because of such decrease in engine negative pressure or stoppage of the engine during automobile running, and accordingly the vaporized fuel may leak to the atmosphere. Moreover, fuel efficiency of a recent gasoline engine has been increasing, and use of gasoline during a combustion process has been decreasing. Therefore, a capacity to purge the vaporized fuel has been reducing.

SUMMARY

It is an objective of the present disclosure to provide a vaporized fuel processing device capable of limiting emission of vaporized fuel to outside a vehicle.

According to an aspect of the present disclosure, a vaporized fuel processing device includes a fuel tank storing fuel used for an internal combustion engine, a pressurizing portion performing a pressurizing process to increase an inner pressure of the fuel tank by supplying gas from outside to inside the fuel tank, and a controller controlling an operation of the pressurizing portion. The controller controls the pressurizing portion to perform the pressurizing process and to keep the inner pressure of the fuel tank at or above a predetermined pressure value at which vaporized fuel is prevented from flowing out of the fuel tank, except for a time of fueling of the fuel tank.

According to another aspect of the present disclosure, a vaporized fuel processing device includes a fuel tank storing fuel used for an internal combustion engine, a canister configured to adsorb vaporized fuel generated in the fuel tank and be capable of desorbing the adsorbed vaporized fuel, a purge pump pumping the vaporized fuel adsorbed to the canister to an intake passage of the internal combustion engine through a purge passage, a purge valve including a valve element switchable between an allowed state where the vaporized fuel is allowed to flow into the intake passage and a prohibited state where the vaporized fuel is prohibited to flow into the intake passage, the purge valve controlling a flow of the vaporized fuel pumped from the purge pump, and a controller controlling at least an operation of the purge pump. The controller controls the purge pump to perform a pressurizing process for increasing an inner pressure of the fuel tank by supplying gas from outside to inside the fuel tank, and to keep the inner pressure of the fuel tank at or above a predetermined pressure value at which the vaporized fuel is prevented from flowing out of the fuel tank, except for a time of fueling of the fuel tank.

The vaporized fuel processing device, except for the fueling time of the fuel tank, maintains the inner pressure of the fuel tank by the supply of gas via the pressurizing portion at or above the predetermined pressure value at which the vaporized fuel is prevented from flowing out from the fuel tank to the atmosphere. The predetermined pressure value at which the vaporized fuel is prevented from flowing out from the fuel tank to the atmosphere is set individually for an actual device. Such maintenance of the inner pressure of the fuel tank so as not to decrease below the predetermined pressure value restricts generation of the vaporized fuel, i.e. evaporation of fuel from a liquid surface of the fuel in the fuel tank. In addition, leakage of fuel to the atmosphere can be limited. Therefore, the vaporized fuel processing device is capable of reducing emission of the vaporized fuel to outside the vehicle.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION

Figure 1:
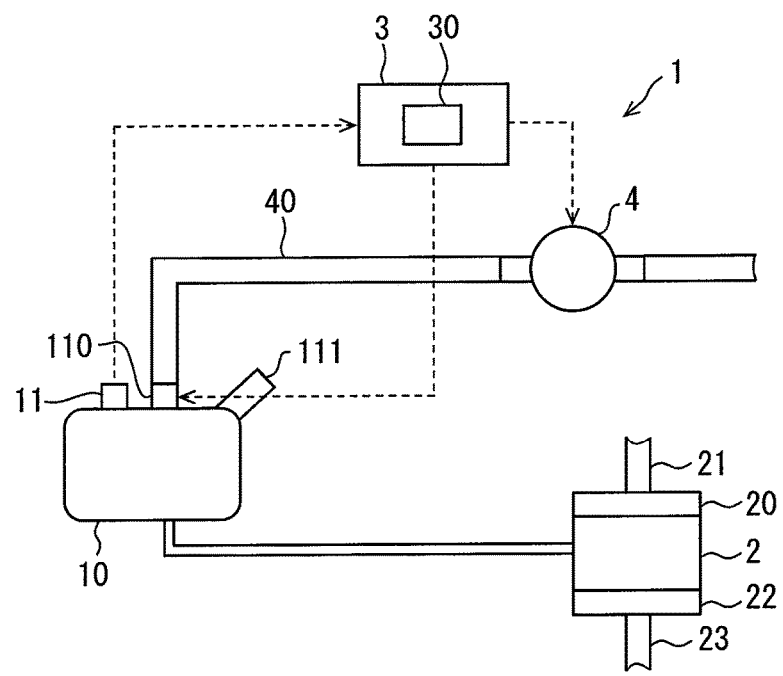
FIG. 1 is a schematic diagram illustrating a vaporized fuel processing device according to a first embodiment of the present disclosure.

Embodiments of the present disclosure will be described hereinafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

(First Embodiment)

A vaporized fuel processing device 1 according to a first embodiment will be described with reference to FIGS. 1 to 4. The vaporized fuel processing device 1 has a function to restrict generation of fuel vapor evaporated from fuel in a fuel tank 10 and prevents emission of the vaporized fuel from the fuel tank 10 to an atmosphere.

The vaporized fuel processing device 1 may be referred to as a "device 1", hereinafter. The vaporized fuel processing device 1 includes the fuel tank 10 that stores therein a fuel such as gasoline to be combusted in an internal combustion engine 2. The fuel in the fuel tank 10 is supplied to the internal combustion engine 2 by an injector through a fuel supply passage that connects the fuel tank 10 and the internal combustion engine 2. The supplied fuel is mixed with an intake air to be combusted in a combustion chamber of the internal combustion engine 2. The internal combustion engine 2 is connected to an intake pipe 21 through which air flows to be suctioned into the combustion chamber, and to an exhaust pipe 23 through which exhaust gas flows to be discharged to outside. The intake pipe 21 is connected to an intake manifold 20 having multiple branched portions connected the combustion chamber of the internal combustion engine 2. The exhaust pipe 23 is connected to an exhaust manifold 22 having multiple branched portions.

The fuel tank 10 is connected to a pump 4 by a pipe defining a passage 40. A pressure sensor 11 is provided in the fuel tank 10 and detects an inner pressure TP of the fuel tank 10. The fuel tank 10 has a fueling portion 111 that opens or closes a fueling port. At a time of fueling of the fuel tank 10, the fueling portion 111 is in an open state. When the fueling is completed, the fueling portion 111 becomes in a closed state and shuts off communication between an inner part of the fuel tank 10 and the atmosphere.

The fuel tank 10 is integrated with an opening-closing valve 110 that opens or closes the passage 40 for allowing or prohibiting communication between the passage 40 and the inner part of the fuel tank 10. When the opening-closing valve 110 is controlled to be in an open state where the passage 40 is open, the pump 4 and the inner part of the fuel tank 10 communicates with each other. When the opening-closing valve 110 is controlled to be in a closed state where the passage 40 is closed, the opening-closing valve 110 functions as a seal valve that is capable of putting the inner space of the fuel tank 10 into an enclosed space. The pump 4 is a fluid driving device including a turbine rotated by an actuator such as a motor. The pump 4 pumps air from the atmosphere to the fuel tank 10 through the passage 40. The pump 4 is controlled to draw air from the outside into the passage 40 when the opening-closing valve 110 is in the open state. The pump 4 is used as an example of a pressurizing portion that increases the inner pressure TP of the fuel tank 10 by supplying air to the inner part of the fuel tank 10.

A controller 3 is an electronic control unit of the vaporized fuel processing device 1. The controller 3 includes at least one arithmetic processing unit (CPU) and at least one memory device as a storage medium storing programs and data. The controller 3 may be a microcomputer including a storage medium readable by a computer, for example. The storage medium is a non-transitory tangible storage medium where a program readable by a computer is stored non-temporarily. The storage medium may be a semiconductor memory or a magnetic disc. The controller 3 may be a single computer or a set of computer resources linked with each other via a data communication device. The controller 3 executes the program, and thereby functions as a device described in the present specification and functions to perform methods described in the present specification.

The methods and/or functions provided by the controller 3 can be provided by software stored in the tangible memory device and a computer executing the software, only by the software, only by hardware, or by combination thereof. For example, when the controller 3 is provided by an electronic circuit of the hardware, the controller 3 may be provided by a digital circuit or an analogue circuit, which has multiple logic circuits.

The controller 3 performs a basic control in the vaporized fuel processing device 1, and includes a determining portion 30 forming a determination circuit. The determining portion 30 determines necessity of a pressurizing process for the inner part of the fuel tank 10 by using the pump 4. Thus, the controller 3 is connected to respective actuators of the pump 4 and the opening-closing valve 110 for controlling operations of the actuators.

The controller 3 is capable of controlling the pump 4 to be operated or stopped by driving a motor, regardless of operation or stoppage of the internal combustion engine 2. The controller 3 is capable of controlling a valve position of the opening-closing valve 110 regardless of the operation or stoppage of the internal combustion engine 2. The controller 3 has an input port to which at least a signal corresponding to the inner pressure TP of the fuel tank 10 detected by the pressure sensor 11 is inputted. The controller 3 controls the open and closed states of the opening-closing valve 110 and an operating state of the pump 4, depending on the detection value corresponding to the inner pressure TP of the fuel tank 10. The controller 3 executes the vaporized fuel limiting control so as to prevent emission of the vaporized fuel from the fuel tank 10 to the outside.

Figure 2:
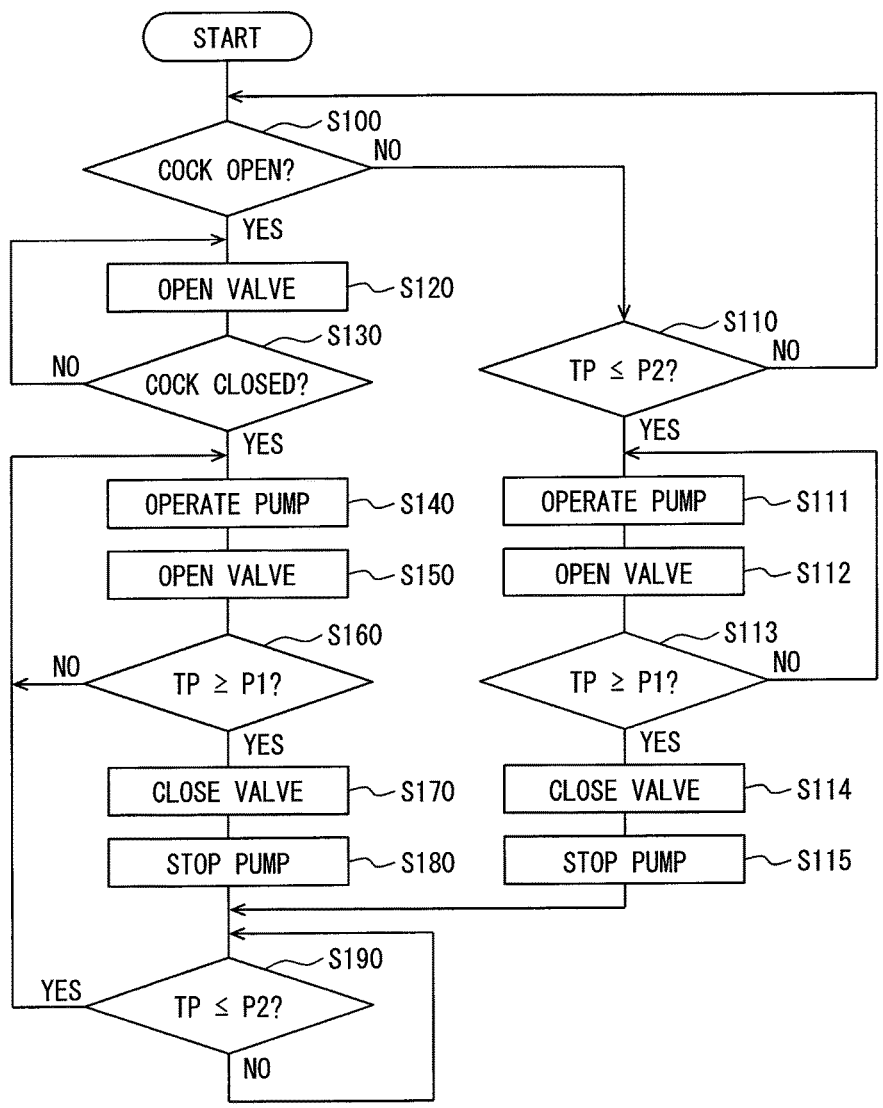
FIG. 2 is a flowchart illustrating a vaporized fuel limiting control in the vaporized fuel processing device according to the first embodiment.
Figure 3:
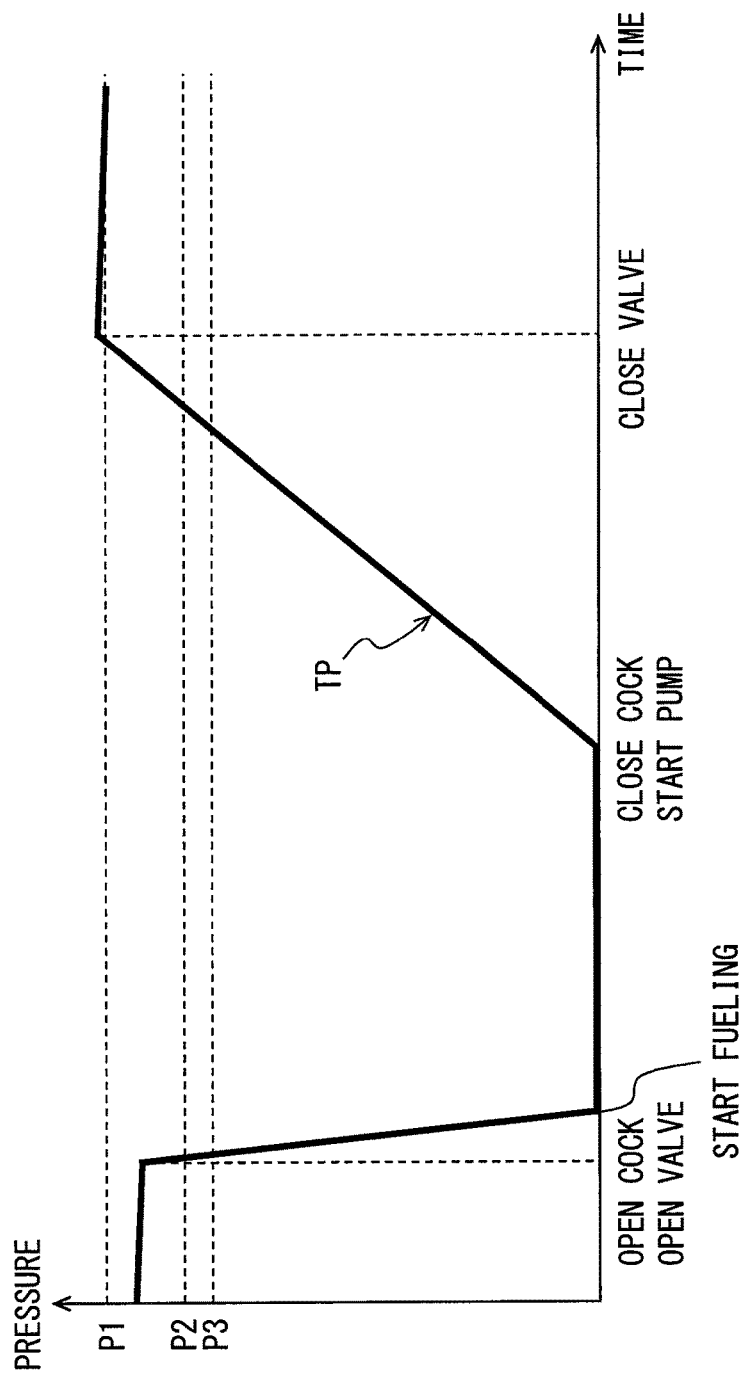
FIG. 3 is a diagram illustrating change in inner pressure of a fuel tank before and after a fueling time in the vaporized fuel processing device according to the first embodiment.

The vaporized fuel limiting control will be described with reference to the flowchart of FIG. 2 and the diagrams of FIGS. 3 and 4. The controller 3 executes a control process according to the flowchart of FIG. 2. The determining portion 30 of the controller 3 executes determining operations at steps S100, S130, S110, S113, S160 and S190 of FIG. 2. The process of the flowchart is executed regardless of a vehicle running time when the internal combustion engine 2 of a vehicle is operating, or regardless of a parked time when the vehicle is parked. The vaporized fuel limiting control can be executed continuously regardless of operation or stoppage of the internal combustion engine 2. Moreover, when a signal representing opening of a fueling cock of the fueling portion 111 is inputted to the controller 3 during one of the steps of the flowchart being executed, the control forcibly jumps to step S120. Upon a start of the flowchart, the controller 3 determines at step S100 whether a signal representing opening of the fueling cock is inputted. When a user opens the fueling cock, a signal notifying the open state is inputted to the controller 3. Thereby, the controller 3 recognizes that fueling starts now, and controls the opening-closing valve 110 to be in the open state at step S120. The opening of the opening-closing valve 110 causes the vaporized fuel of the fuel tank 10 to flow out to the passage 40, and thereby the inner pressure TP of the fuel tank 10 starts to reduce sharply. As shown in FIG. 3, the fueling is started after the inner pressure TP of the fuel tank 10 has been reduced sufficiently.

The vaporized fuel processing device 1 may include a mechanism that closes the passage 40 during stoppage of the pump 4. In this case, the vaporized fuel flowing out of the fuel tank 10 into the passage 40 is blocked by the pump 4 and prevented from outflowing to the atmosphere through the pump 4. Therefore, the vaporized fuel is kept within the passage 40 between the fuel tank 10 and the pump 4.

At next step S130, the controller 3 determines whether a signal representing closing of the fueling cock is inputted. This determining operation of step S130 is repeated until the signal representing closing of the fueling cock is inputted to the controller 3. When a user closes the fueling cock, the signal notifying the closed state of the fueling cock is inputted to the controller 3, and the controller 3 is accordingly capable of recognizing that the fueling has been completed.

When the controller 3 determines at step S130 that the signal representing completion of the fueling is inputted, the controller 3 operates the pump 4 at step S140 and controls the opening-closing valve 110 to be maintained in the open state at step S150. According to these control operations, air sucked from the outside by the pump 4 is supplied to the inner part of the fuel tank 10 through the passage 40, and the inner pressure TP of the fuel tank 10 starts to increase. The process pressurizing the fuel tank 10 continues until the inner pressure TP of the fuel tank 10 is determined to be higher than or equal to a first threshold value P1 at step S160. The first threshold value P1 is set at or above a saturation pressure that is detected when an inner space of the fuel tank 10 above a liquid surface of fuel is filled with fuel vapor. The first threshold value P1 is the highest one of three different predetermined pressures, and the three different predetermined pressures are all set to be higher than or equal to the saturation pressure based on actual measured values in a real machine similar to the device 1.

When the inner pressure TP of the fuel tank 10 is determined at step S160 to be higher than or equal to the first threshold value P1, the controller 3 controls the opening-closing valve 110 to be in the closed state at step S170 and stops the operation of the pump 4 at step S180. The inner pressure TP that has become higher than or equal to the first threshold value P1 gradually decreases in accordance with termination of the pressurizing process and with increase in fuel consumption as shown in FIG. 4. While the pressurizing process being terminated, it is determined at step S190 whether the inner pressure TP of the fuel tank 10 is lower than or equal to a second threshold value P2. The second threshold value P2 is set to be lower than the first threshold value P1 by a predetermined pressure and be higher than the saturation pressure. The second threshold value P2 is the second highest one of the three different predetermined pressures.

The state where the tank is not pressurized is maintained during the inner pressure TP of the fuel tank 10 being determined to be above the second threshold value P2 at step S190. When the inner pressure TP of the fuel tank 10 is determined to be lower than or equal to the second threshold value P2 at step S190, the control operation of step S140 is performed to pressurize the fuel tank 10 again. Accordingly, as shown in FIG. 4, the inner pressure TP that has reduced to or below the second threshold value P2 is increased. The pressurizing process continues until the inner pressure TP of the fuel tank 10 is determined to be higher than or equal to the first threshold value P1 at step S160.

Figure 4:
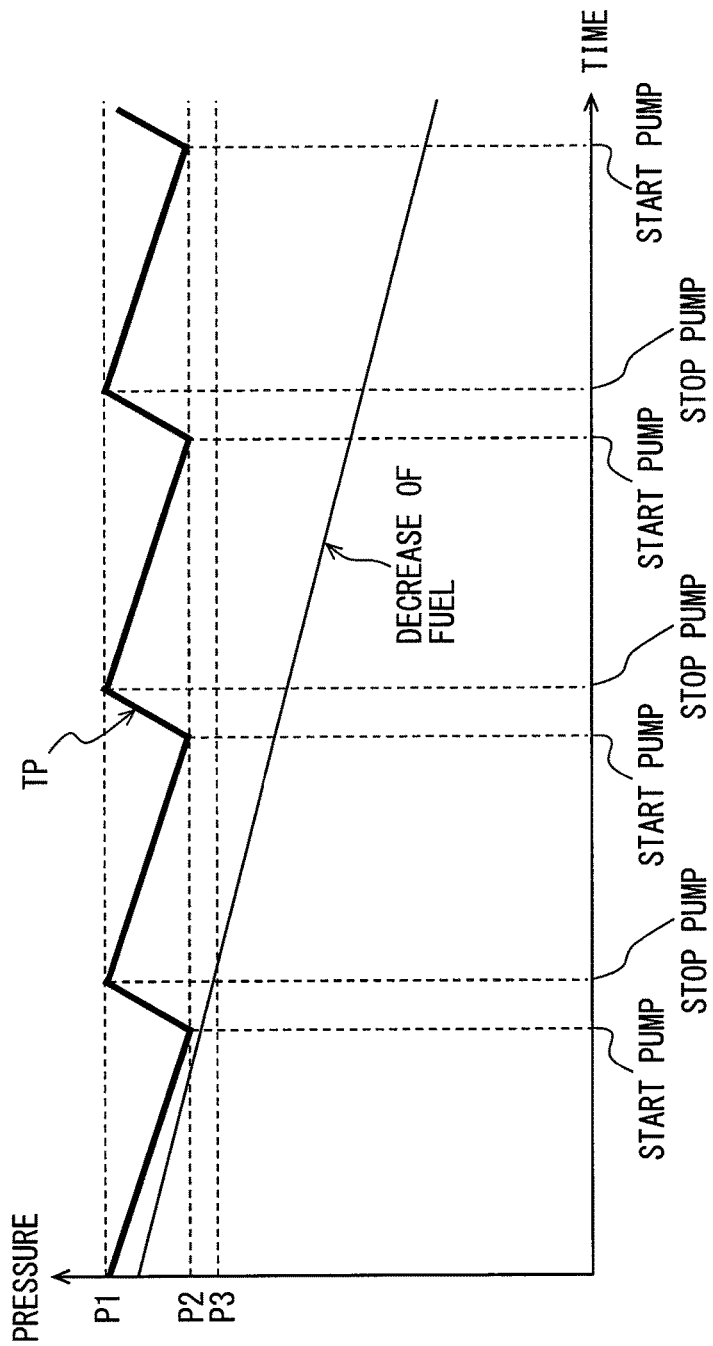
FIG. 4 is a diagram illustrating change in inner pressure of the fuel tank during a time other than the fueling time, in the vaporized fuel processing device according to the first embodiment.

Such continuous post-fueling process, as shown in FIGS. 3 and 4, maintains the inner pressure TP of the fuel tank 10 above a third threshold value P3 despite ups and downs of the inner pressure TP. The third threshold value P3 is set to be lower than the second threshold value P2 by a predetermined pressure and to be higher than the saturation pressure. The third threshold value P3 is the lowest one of the three different predetermined pressures. The third threshold value P3 is also a predetermined pressure value at which the vaporized fuel is prevented from flowing out of the fuel tank 10 to the atmosphere.

When it is determined at step S100 that the signal representing opening of the fueling cock is not inputted, the controller 3 recognizes that the vehicle is in a state other than the fueling time. For example, the controller 3 recognizes that the vehicle is in a vehicle running state, a stop state, or a parked state. At next step S110, the controller 3 determines whether the inner pressure TP of the fuel tank 10 is lower than or equal to the second threshold value P2. When the inner pressure TP is determined to be higher than the second threshold value P2, the inner pressure TP is maintained at a high level enough to prevent outflow of the vaporized fuel from the fuel tank 10. Thus, during the high level being maintained, the control operation of step S100 is performed to determine whether fueling starts.

When the inner pressure TP of the fuel tank 10 is determined to be lower than or equal to the second threshold value P2 at step S110, the controller 3 operates the pump 4 at step S111 and controls the opening-closing valve 110 to be maintained in the open state at step S112. Accordingly, air sucked from the outside by the pump 4 is supplied to the inner part of the fuel tank 10 through the passage 40, and thus the inner pressure TP of the fuel tank TP increases. The process pressurizing the fuel tank 10 continues until the inner pressure TP of the fuel tank 10 is determined to be higher than or equal to the first threshold value P1 at step S113.

When the inner pressure TP of the fuel tank 10 is determined to be higher than or equal to the first threshold value P1 at step S113, the controller 3 controls the opening-closing valve 110 to be in the closed state at step S114 and stops the operation of the pump 4 at step S115. Accordingly, the inner pressure TP of the fuel tank 10 gradually decreases from a level above the first threshold value P1 in accordance with termination of the pressurizing process and with increase in fuel consumption, as shown in FIG. 4. Subsequently, at step S190, when the inner pressure TP of the fuel tank 10 becomes lower than or equal to the second threshold value P2 during the termination of the pressurizing process, the process pressurizing the fuel tank 10 is started again at step S140. As shown in FIG. 4, in a time other than the fueling time, the inner pressure TP of the fuel tank 10 repeats ups and down while being maintained upper than or equal to the third threshold value P3 at which the vaporized fuel is prevented from releasing to the atmosphere from the fuel tank 10. When the inner pressure TP of the fuel tank 10 is more than or equal to the third threshold value P3, it can be expected that generation of fuel vapor in the fuel tank 10 is restricted. Therefore, the vaporized fuel processing device 1 is capable of restricting emission of the vaporized fuel to outside the vehicle continuously.

The pressure sensor 11 is used as an example of a device detecting a pressure at a predetermined position within a passage extending from the inner part of the fuel tank 10 to the pressurizing portion such as the pump 4, for example. Therefore, the pressures used in the determination processes of steps S110, S113, S160 and S190 are a pressure of the predetermined position including the inner pressure TP of the fuel tank 10 and may be detected by a pressure sensor provided in the passage 40.

Next, actions and effects provided by the vaporized fuel processing device 1 of the first embodiment will be described. The device 1 includes the fuel tank 10, the pump 4 increasing the inner pressure TP of the fuel tank 10 by supplying gas from outside to inside the fuel tank 10, and the controller 3 controlling the operation of the pump 4. The controller 3 controls the pump 4 such that the inner pressure TP of the fuel tank 10 does not reduce below a pressure value at which the vaporized fuel is prevented from emitting from the fuel tank 10, except for the fueling time of the fuel tank 10.

According to the device 1, at time other than the fueling time of the fuel tank 10, the inner pressure TP of the fuel tank 10 is controlled to be maintained by supply of gas from the pump 4 at a pressure higher than or equal to the predetermined pressure value at which the vaporized fuel is prevented from flowing out from the fuel tank 10 to outside. The predetermined pressure value is required to be set individually for a device that is to be controlled. Hence, the predetermined pressure value is set based on an experiment in a real machine or on an actually measured value at which it has been confirmed that the vaporized fuel is prevented from flowing out to the outside. Therefore, the device 1 keeps the inner pressure TP of the fuel tank 10 at a high level such that the inner pressure TP does not reduce below the predetermined pressure value that has been set in the above-described manner. Accordingly, the device 1 is capable of restricting generation of the vaporized fuel through evaporation of fuel from the liquid surface of the fuel in the fuel tank 10. Consequently, the device 1 is capable of limiting leakage of the vaporized fuel to outside the vehicle or to the atmosphere.

According to the above-described vaporized fuel limiting control, the controller 3 controls the pump 4 such that the pressurizing process is stopped when the inner pressure TP of the fuel tank 10 or the pressure at the position within the passage extending from the inner part of the fuel tank 10 to the pump 4 becomes higher than or equal to the first threshold value P1 that has been set above the third threshold value P3. The controller 3 controls the pump 4 such that the pressurizing process is started when the inner pressure TP of the fuel tank 10 or the pressure at the position within the passage extending from the inner part of the fuel tank 10 to the pump 4 becomes lower than or equal to the second threshold value P2 that has been set above the third threshold value P3 and below the first threshold value P1.

According to this control, the inner pressure TP of the fuel tank 10 or the pressure at the position within the passage extending from the inner part of the fuel tank 10 to the pump 4 can be controlled so as not to be greatly above or greatly below the tow threshold values and thereby be controlled and maintained more certainly to be higher than or equal to the third threshold value P3 at which the vaporized fuel is prevented from flowing out to the atmosphere. Since the pressurizing process is stopped when the detected pressure becomes higher than or equal to the first threshold value P1, an operating time of the pump 4 for the pressurizing can be controlled to be reduced. Further, since the detected pressure is prevented from increasing greatly above the first threshold value P1, a highly pressurized and loaded time can be shortened. Therefore, a load applied on the fuel tank 10 or on a pipe defining the passage 40 can be reduced.

(Second Embodiment)

Figure 5:
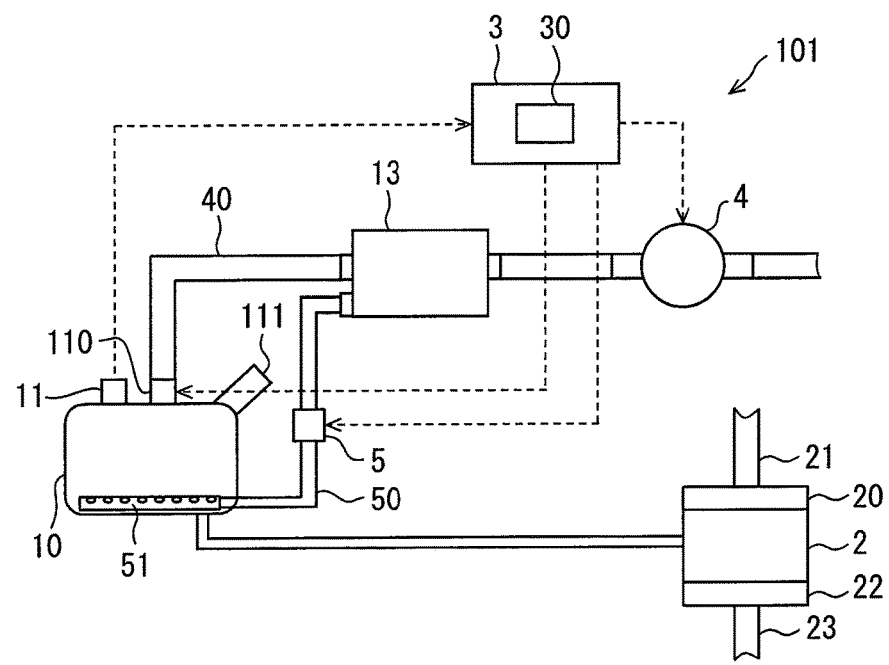
FIG. 5 is a schematic diagram illustrating a vaporized fuel processing device according to a second embodiment of the present disclosure.
Figure 6:
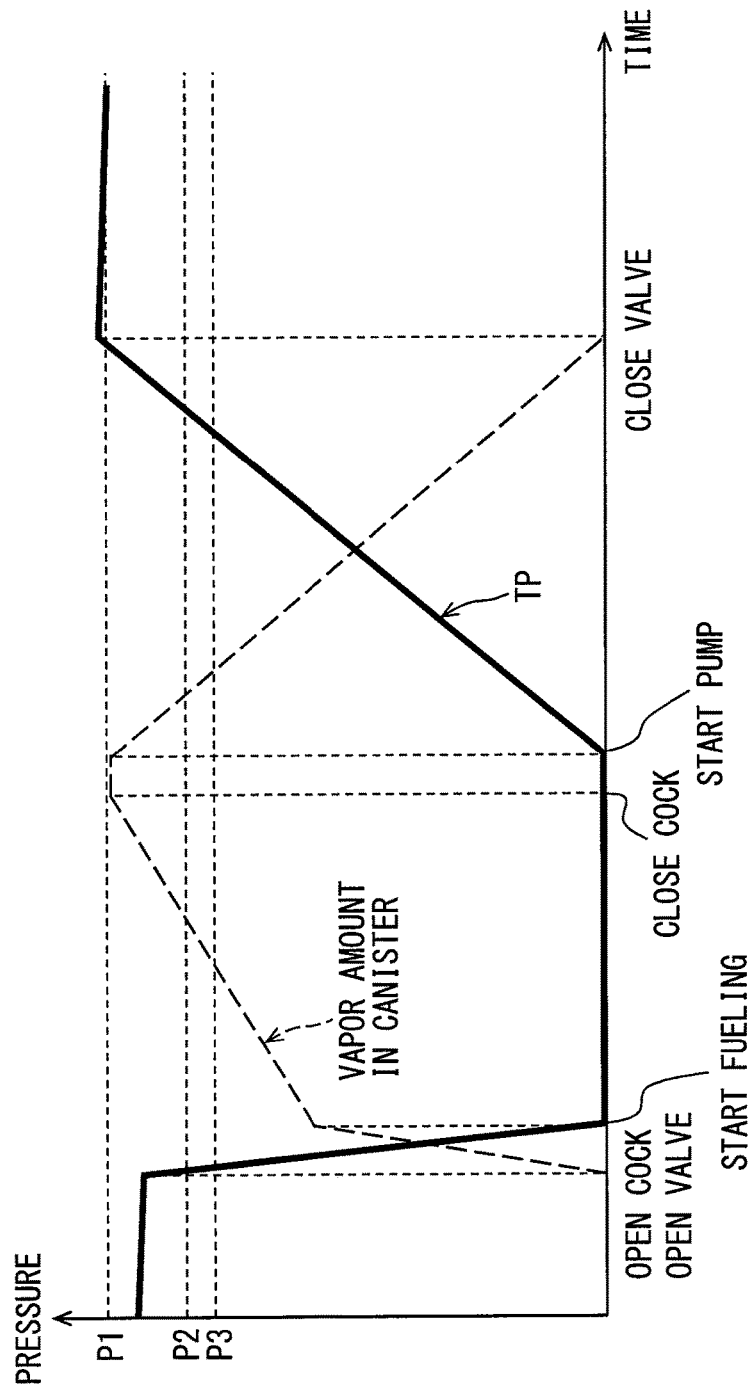
FIG. 6 is a diagram illustrating change in inner pressure of a fuel tank before and after a fueling time in the vaporized fuel processing device according to the second embodiment.

A vaporized fuel processing device 101 of a second embodiment will be described with reference to FIGS. 5 and 6. The vaporized fuel processing device 101 may be referred to also as a "device 101", hereinafter. The device 101 is different from the device 1 of the first embodiment in that the device 101 includes a canister 13 to which vaporized fuel generated in a fuel tank 10 is adsorbable. Hence, in the device 101, the vaporized fuel in the fuel tank 10 passes through an opening-closing valve 110 that is in an open state, and then flows out to a passage 40. Subsequently, the vaporized fuel flows into and is adsorbed to the canister 13. The device 101 has a function to return the adsorbed vaporized fuel in the canister 13 to an inner part of the fuel tank 10. Configurations, actions and effects without any explanation in the second embodiment are similar to those of the first embodiment. Only different points from the first embodiment will be described below.

The fuel tank 10 is connected to an inflow portion of the canister 13 through a pipe defining the passage 40. The canister 13 is a container in which an adsorbent such as active carbon is enclosed. The canister 13 draws therein the vaporized fuel generated in the fuel tank 10 through the passage 40, and the vaporized fuel is adsorbed to the adsorbent temporarily. The canister 13 communicates with the inner part of the fuel tank 10 through another passage 50 defined by another pipe.

The pipe defining the passage 50 is provided with a valve 5 that is switchable into between an open state where the passage 50 is open and a closed state where the passage 50 is closed. The passage 50 is connected to a discharge portion 51 that is disposed in a bottom portion inside the fuel tank 10. Thus, the discharge portion 51 is immersed in the fuel accumulated in the fuel tank 10. The discharge portion 51 has multiple small holes. When the valve 5 is controlled to be in the open state, and when a pump 4 is controlled to supply gas to the fuel tank 10, the vaporized fuel adsorbed to the canister 13 flows toward the fuel tank 10 through the passage 50 and is discharged into the fuel in the fuel tank 10 from the multiple small holes with bubbling. Accordingly, the vaporized fuel is likely to be dissolved in the fuel when returned to the inner part of the fuel tank 10. In the present specification, the return of the vaporized fuel to the fuel tank 10 with bubbling is referred to as "bubbling of the vaporized fuel".

When a fueling cock is opened, the controller 3 obtains a signal corresponding to the opening of the fueling cock and controls the opening-closing valve 110 to be in the open state. When the opening-closing valve 110 is opened, the vaporized fuel in the fuel tank 10 flows into the canister 13 through the passage 40 swiftly. Thus, as shown in a long dashed line of FIG. 6, an amount of fuel vapor (i.e. vapor amount) in the canister 13 increases sharply. Since an amount of the fuel in the fuel tank 10 increases during fueling time from a start to an end of fueling of the fuel tank 10, the vaporized fuel flows into the canister 13 through the passage 40 continuously. Therefore, the vapor amount in the canister 13 increases steadily at an increase rate which is lower than that immediately after opening of the opening-closing valve 110.

When the fueling is ended, and when the fueling coke is closed, the valve 5 is controlled to be in the open state, and the pump 4 starts to pressurize the fuel tank 10. Accordingly, gas is supplied to the fuel tank 10 through the passage 40 while the vaporized fuel adsorbed to the canister 13 is supplied to the discharge portion 51 through the passage 50. Therefore, as shown by the bold solid line and the long dashed line of FIG. 6, the inner pressure TP of the fuel tank 10 increases regularly while the vapor amount in the canister 13 decreases steadily simultaneously, until the opening-closing valve 110 is controlled to be in the closed state.

Therefore, when the controller 3 executes the pressurizing process, the device 101 ejects the vaporized fuel desorbed from the canister 13 into the fuel in the fuel tank 10 through the discharge portion 51 by utilizing a pressurizing force of the pump 4 that is used for supply of gas to the fuel tank 10. The device 101 is capable of preventing outflow of the vaporized fuel to outside the fuel tank 10 while returning the vaporized fuel desorbed from the canister 13 to the fuel tank 10, by the pressurizing process of the fuel tank 10 via the pump 4.

(Third Embodiment)

Figure 7:
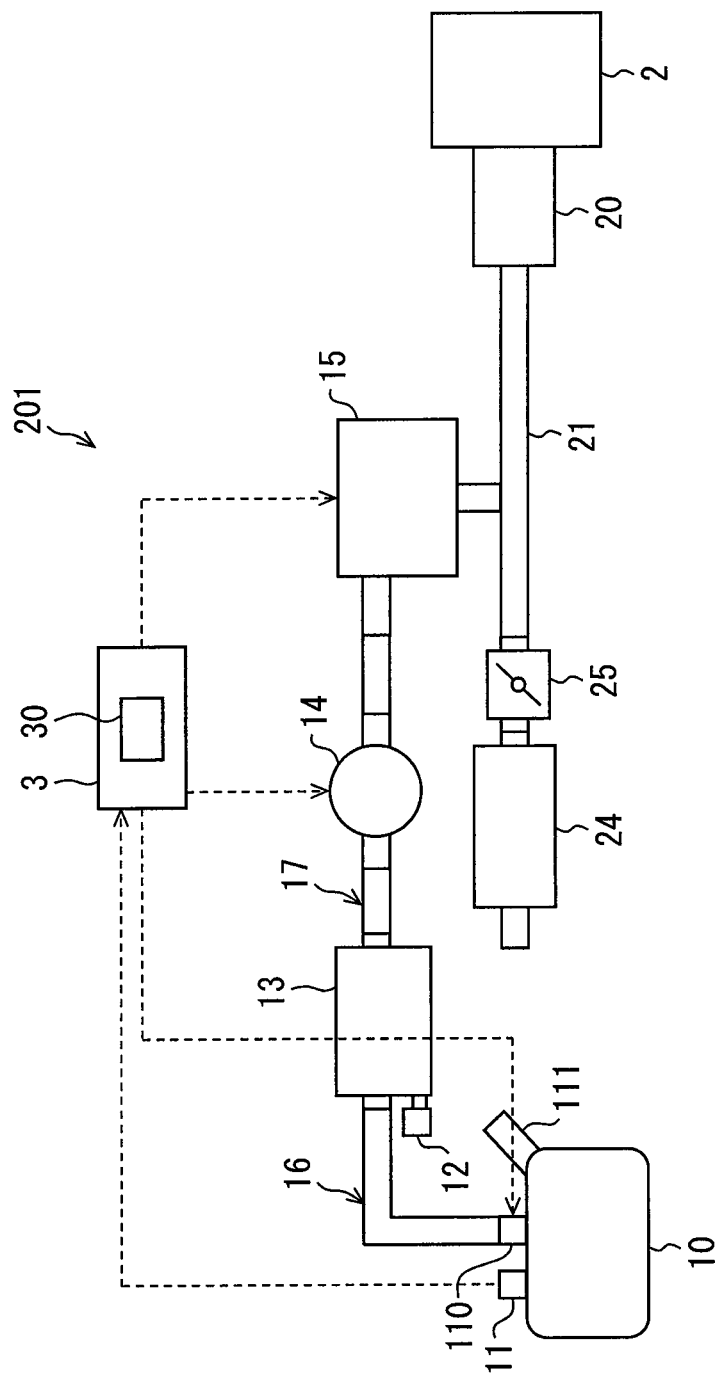
FIG. 7 is a schematic diagram illustrating a vaporized fuel processing device according to a third embodiment of the present disclosure.

A vaporized fuel processing device 201 of a third embodiment will be described with reference to FIG. 7. Hereinafter, the vaporized fuel processing device 201 may be referred to also as a "device 201". The device 201 is different from the first embodiment in that HC gas contained in fuel adsorbed to a canister 13 is supplied to an intake passage of an internal combustion engine 2. In the device 201, the pressurizing process performed via the pump 4 in the vaporized fuel limiting control of the first embodiment is performed via a purge pump 14. Therefore, the purge pump 14 forms an example of the pressurizing portion that increases an inner pressure TP of a fuel tank 10 by supplying gas to an inner part of the fuel tank 10. The device 201, as shown in FIG. 7, includes an intake system of the internal combustion engine 2 that forms the intake passage of the internal combustion engine 2, and a vaporized-fuel purge system that supplies the vaporized fuel to the intake system of the internal combustion engine 2. Configurations, actions and effects without any explanations in the third embodiment are similar to those of the first embodiment. Only different points from the first embodiment will be described below.

The vaporized fuel introduced into the intake passage of the internal combustion engine 2 is mixed with combustion fuel supplied to the internal combustion engine 2 through injectors, for example. The mixed fuel is combusted in a combustion chamber in the internal combustion engine 2. The internal combustion engine 2 mixes and combusts at least the vaporized fuel desorbed from the canister 13 and the combustion fuel. In the intake system of the internal combustion engine 2, an intake pipe 21 is connected to an intake manifold 20 while a throttle valve 25 and an air filter 24 are disposed in the intake pipe 21. The intake passage of the internal combustion engine 2 is a passage including the intake manifold 20, the intake pipe 21, the throttle valve 25 and the air filter 24.

In the vaporized-fuel purge system, the fuel tank 10 and the canister 13 are connected by a pipe defining a vapor passage 16. The canister 13 and the intake pipe 21 are connected through a pipe defining a purge passage 17 and through a purge valve 15. The purge pump 14 is provided in the purge passage 17. The purge passage 17 includes an inner passage of the purge pump 14 and an inner passage of the purge valve 15. The intake pipe 21 is a passage forming member that defines the intake passage of the internal combustion engine.

The air filter 24 is located upstream of the intake pipe 21 to trap grit and dust contained in intake air. The throttle valve 25 is an intake amount adjustment valve that regulates an amount of intake air flowing into the intake manifold 20 by adjusting an opening degree of an inlet portion of the intake manifold 20. The intake air passes through the air filter 24 and the throttle valve 25 in sequence in the intake passage and then flows into the intake manifold 20. Subsequently, the intake air is mixed at a predetermined air-fuel ratio with the combustion fuel injected by the injector, and the mixture of the air and fuel is combusted in the combustion chamber.

The fuel tank 10 is connected to an inflow portion of the canister 13 by the pipe defining the vapor passage 16. The canister 13 is a container in which an adsorbent such as active carbon is enclosed. The canister 13 draws therein the vaporized fuel generated in the fuel tank 10 through the vapor passage 16, and the vaporized fuel is adsorbed to the adsorbent temporarily. The canister 13 is provided integrally with a valve module 12. The valve module 12 therein includes a canister closing valve that opens or closes a suction portion through which flesh outside air is sucked, and an inner pump capable of discharging or drawing gas to or from the atmosphere. The canister closing valve may be referred to also as a CCV. Since the canister 13 includes the CCV, an atmosphere pressure can be applied to an inside the canister 13. The canister 13 is capable of desorbing (i.e. purging) easily the vaporized fuel adsorbed to the adsorbent by the action of the sucked flesh air.

An outflow portion of the canister 13, from which the vaporized fuel desorbed from the adsorbent flows out, is connected to an end of a pipe defining a part of the purge passage 17. Another end of the pipe is connected to an inflow portion of the purge pump 14. The purge pump 14 and the purge valve 15 are connected by a pipe defining another part of the purge passage 17. The purge pump 14 is a purging fluid driving device that includes a turbine rotated by an actuator such as a motor. The purge pump 14 pumps the vaporized fuel from the canister 13 to the intake passage of the internal combustion engine 2.

The purge valve 15 is an example of an opening-closing device having a valve element that opens or closes the purge passage 17. The valve element of the purge valve 15 opens or closes a fuel supply passage provided in a main body of the purge valve 15. Therefore, the purge valve 15 is capable of providing an allowed state where the vaporized fuel is allowed to be supplied from the canister 13 to the internal combustion engine 2 and a prohibited state where the supply of the vaporized fuel is prohibited. The purge valve 15 is formed by an electromagnetic valve device, and includes the valve element, an electromagnetic coil and a spring. The purge valve 15 is switchable by a controller 3 between an energized state and a non-energized state, and in accordance with the switch control, the opening degree of the fuel supply passage is controlled between a fully open state and a fully closed state. The purge valve 15 moves the valve element in accordance with a difference between an electromagnetic force, generated when an electric circuit of the electromagnetic coil is energized, and an urging force of the spring. The purge valve 15 separates the valve element from a valve seat formed on the main body to open the fuel supply passage. The controller 3 performs an energization of the electromagnetic coil by controlling a duty cycle that is a ratio of an energization time period to a single time period consisting of the energization time period and non-energization time period. The purge valve 15 may be referred to also as a duty control valve. An energization control of such purge valve 15 enables adjustment of a flow rate of the vaporized fuel flowing through the fuel supply passage.

The controller 3 is connected to and controls respective actuators of the purge pump 14, the purge valve 15, an opening-closing valve 110, the CCV and an inner pump. The controller 3 is connected to an actuator of the purge pump 14, such as a motor. The controller 3 is capable of operating or stopping the purge pump 14 by driving the motor regardless of operation and stoppage of the internal combustion engine 2.

The vaporized fuel taken in the intake manifold 20 from the canister 13 is mixed with the combustion fuel supplied to the internal combustion engine 2 through the injector, and the mixed fuel is combusted in the combustion chamber of the internal combustion engine 2. In the combustion chamber of the internal combustion engine 2, an air-fuel ratio which is a mixing ratio of the combustion fuel and the intake air is controlled to become a predetermined air-fuel ratio. The controller 3 executes a duty control of opening-closing time of the purge valve 15. Hence, a purged amount of the vaporized fuel is controlled so as to maintain the predetermined air-fuel ratio even when the vaporized fuel is purged.

As described above, the purge pump 14 can be operated similarly to the pump 4 described in the first embodiment. Hence, the effects of pressurizing to reduce generation of vaporized fuel can be incorporated from the above-described embodiment. Therefore, the vaporized fuel limiting control described referring to FIGS. 2 and 3 in the first embodiment can be performed similarly in the device 201 by replacement of the pump 4 by the purge pump 14. When the purge pump 14 supplies gas to the fuel tank 10 and increases the inner pressure TP of the fuel tank 10 in the pressurizing process, the inner pressure TP of the fuel tank 10 continuously increases while the vapor amount in the canister 13 reduces steadily as described referring to FIG. 6 in the second embodiment.

Accordingly, the controller 3 controls the purge pump 14 to perform the pressurizing process such that the inner pressure TP of the fuel tank 10 does not decrease below a predetermined pressure value at which the vaporized fuel is prevented from flowing out of the fuel tank 10 to the atmosphere, except for the fueling time of the fuel tank 10. According to the device 201, at a time other than the fueling time of the fuel tank 10, the inner pressure TP of the fuel tank 10 is controlled by gas supply from the purge pump 14 such that the inner pressure TP is maintained at or higher than the predetermined pressure value at which the vaporized fuel is prevented from flowing out of the fuel tank 10 to the atmosphere. In the device 201, the purge pump 14 which is used for purging of the vaporized fuel is used also as the pressurizing portion, and thus the inner pressure TP of the fuel tank 10 can be maintained at high level so as not to decrease below the predetermined pressure value. Thus, generation of the vaporized fuel due to evaporation of fuel from a liquid surface of the fuel in the fuel tank 10 can be restricted. Therefore, the device 201 is capable of limiting leakage of the vaporized fuel to outside the vehicle or to the atmosphere.

The present disclosure is not limited to the above-described embodiments. The disclosure includes the above-described embodiments and modifications by a skilled person based on these embodiments. For example, the disclosure is not limited to the combination of the components or elements described in the embodiments, and may be modified variously to be exploited. The disclosure can be exploited in a variety of combinations. The disclosure may include an additional part which can be added to the embodiments. The disclosure includes one where a component or element of the embodiments is omitted. The disclosure includes replacement or combination of components or elements between one and another of the embodiments. The disclosed technical scope is not limited to the descriptions of the embodiments. Although the present disclosure has been fully described in connection with the preferred embodiments thereof with reference to the accompanying drawings, it is to be noted that various changes and modifications will become apparent to those skilled in the art.

The pump 4 of the above-described embodiments is not limited to one provided in the passage 40. The pump 4 may be attached integrally to the fuel tank 10 so as to be capable of pressurizing the inner part of the fuel tank 10. The pump 4 may be integrated to the opening-closing valve 110.

The opening-closing valve 110 of the above-described embodiments may be replaced with a backflow prevention valve that allows inflow of fluid from outside to inside the tank and prohibits outflow of the fluid from inside to outside the tank.

In the second embodiment, the pump 4 is controlled to supply the gas into the fuel tank 10 to pressurize the inner part of the fuel tank 10. However, the inner pump of the valve module 12 integrated with the canister 13 may be controlled to pressurize the inner part of the fuel tank 10.

In the third embodiment, the purge pump 14 is controlled to supply the gas into the fuel tank 10 to pressurize the inner part of the fuel tank 10. However, the inner pump of the valve module 12 integrated with the canister 13 may be controlled to pressurize the inner part of the fuel tank 10.

The vaporized fuel processing device capable of supplying the vaporized fuel to the intake passage of the internal combustion engine 2 as in the third embodiment may include both the opening-closing valve 110 and the above-described backflow prevention valve.

In the third embodiment, the valve device attached to the intake pipe 21 employs the purge valve 15, but the valve device may at least include a valve switchable between a fully open state where a passage communicating with the intake passage of the internal combustion engine 2 is open and a fully closed state where the passage is closed. For example, the valve device may at least be an opening-closing valve switchable between the fully open state and the fully closed state, and the purge valve 15 capable of adjusting an opening degree of the passage may be disposed to be closer to the canister 13 than the valve device is. The valve device communicating with the intake passage may include therein the purge pump 14 and the purge valve 15.

The pressurizing portion including the pump 4 of the above-described embodiments may include a positive-displacement pump such as a diaphragm pump.

The device 201 of the third embodiment may not include the throttle valve.

Additional advantages and modifications will readily occur to those skilled in the art. The disclosure in its broader terms is therefore not limited to the specific details, representative apparatus, and illustrative examples shown and described.

What is claimed is:

1. A vaporized fuel processing device comprising:
 a fuel tank storing fuel used for an internal combustion engine;
 a pump performing a pressurizing process to increase an inner pressure of the fuel tank by supplying gas from outside to inside the fuel tank; and
 a controller controlling an operation of the pump, wherein the controller controls the pump to perform the pressurizing process and to keep the inner pressure of the fuel tank at or above a predetermined pressure value at which vaporized fuel is prevented from flowing out of the fuel tank, during both operation and stoppage of the internal combustion engine except for a time of fueling of the fuel tank.

2. The vaporized fuel processing device according to claim 1, wherein the controller controls the pump to stop the pressurizing process when the inner pressure of the fuel tank or a pressure at a position within a passage extending from the inside of the fuel tank to the pump becomes higher than or equal to a first threshold value that is set to be higher than the predetermined pressure value, and the controller controls the pump to start the pressurizing process when the inner pressure of the fuel tank or the pressure at the position within the passage extending from the inside of the fuel tank to the pump becomes lower than or equal to a second threshold value that is set to be higher than the predetermined pressure value and lower than the first threshold value.

3. The vaporized fuel processing device according to claim 1, further comprising:

a canister configured to adsorb the vaporized fuel generated in the fuel tank and be capable of desorbing the adsorbed vaporized fuel; and a pipe positioned inside the fuel tank and connected to the, canister, the pipe ejecting the vaporized fuel from the canister into the fuel stored in the fuel tank, wherein when the controller performs the pressurizing process, the pipe ejects the vaporized fuel desorbed from the canister into the fuel in the fuel tank by utilizing a pressure force of the pump used for the supplying of gas.

4. A vaporized fuel processing device comprising:

a fuel tank storing fuel used for an internal combustion engine;

a canister configured to adsorb vaporized fuel generated in the fuel tank and be capable of desorbing the adsorbed vaporized fuel;

a purge pump pumping the vaporized fuel adsorbed to the canister to an intake passage of the internal combustion engine through a purge passage;

a purge valve including a valve element switchable between an allowed state where the vaporized fuel is allowed to flow into the intake passage and a prohibited state where the vaporized fuel is prohibited to flow into the intake passage, the purge valve controlling a flow of the vaporized fuel pumped from the purge pump; and a controller controlling at least an operation of the purge pump, wherein the controller controls the purge pump to perform a pressurizing process for increasing an inner pressure of the fuel tank by supplying gas from outside to inside the fuel tank, and to keep the inner pressure of the fuel tank at or above a predetermined pressure value at which the vaporized fuel is prevented from flowing out of the fuel tank, during both operation and stoppage of the internal combustion engine except for a time of fueling of the fuel tank.

5. A vaporized fuel processing device comprising:

a fuel tank storing fuel used for an internal combustion engine;

a pump performing a pressurizing process to increase an inner pressure of the fuel tank by supplying gas from outside to inside the fuel tank;

a controller controlling an operation of the pump;

a canister configured to adsorb the vaporized fuel generated in the fuel tank and be capable of desorbing the adsorbed vaporized fuel; and a pipe positioned inside the fuel tank and connected to the canister, the pipe ejecting the vaporized fuel from the canister into the fuel stored in the fuel tank, wherein the controller controls the pump to perform the pressurizing process and to keep the inner pressure of the fuel tank at or above a predetermined pressure value at which vaporized fuel is prevented from flowing out of the fuel tank, except for a time of fueling of the fuel tank, and when the controller performs the pressurizing process, the pipe ejects the vaporized fuel desorbed from the canister into the fuel in the fuel tank by utilizing a pressure force of the pump used for the supplying of gas.

6. A vaporized fuel processing device comprising:

a fuel tank storing fuel used for an internal combustion engine;

a canister configured to adsorb vaporized fuel generated in the fuel tank and be capable of desorbing the adsorbed vaporized fuel;

a purge pump pumping the vaporized fuel adsorbed to the canister to an intake passage of the internal combustion engine through a purge passage;

a purge valve including a valve element switchable between an allowed state where the vaporized fuel is allowed to flow into the intake passage and a prohibited state where the vaporized fuel is prohibited to flow into the intake passage, the purge valve controlling a flow of the vaporized fuel pumped from the purge pump;

a controller controlling at least an operation of the purge pump;

and a pipe positioned inside the fuel tank and connected to the canister, the pipe ejecting the vaporized fuel from the canister into the fuel stored in the fuel tank, wherein the controller controls the purge pump to perform a pressurizing process for increasing an inner pressure of the fuel tank by supplying gas from outside to inside the fuel tank, and to keep the inner pressure of the fuel tank at or above a predetermined pressure value at which the vaporized fuel is prevented from flowing out of the fuel tank, except for a time of fueling of the fuel tank, and when the controller performs the pressurizing process, the pipe ejects the vaporized fuel desorbed from the canister into the fuel in the fuel tank by utilizing a pressure force of the purge pump used for the supplying of gas.

\* \* \* \* \*